United States Patent
Hammersley et al.

(10) Patent No.: US 9,729,672 B2
(45) Date of Patent: Aug. 8, 2017

(54) COLLABORATIVE EDITING

(71) Applicants: John Hammersley, Derby (GB); John Lees-Miller, Bristol (GB)

(72) Inventors: John Hammersley, Derby (GB); John Lees-Miller, Bristol (GB)

(73) Assignee: WRITELATEX LIMITED, London (GB)

( * ) Notice: Subject to any disclaimer, the term of this patent is extended or adjusted under 35 U.S.C. 154(b) by 172 days.

(21) Appl. No.: 13/792,660

(22) Filed: Mar. 11, 2013

(65) Prior Publication Data

US 2014/0258371 A1    Sep. 11, 2014

(51) Int. Cl.

| G06F 15/16 | (2006.01) |
| H04L 29/06 | (2006.01) |
| H04L 29/08 | (2006.01) |
| G06F 9/45  | (2006.01) |
| G06F 12/00 | (2006.01) |

(52) U.S. Cl.
CPC .............. *H04L 67/42* (2013.01); *G06F 8/41* (2013.01); *H04L 29/08072* (2013.01)

(58) Field of Classification Search
CPC .. G06Q 10/10; G06Q 10/101; G06F 17/2288; H04L 29/06401; H04L 65/4015
USPC ............... 709/203, 206–207, 223–229, 250
See application file for complete search history.

(56) References Cited

U.S. PATENT DOCUMENTS

| 2004/0054967 A1* | 3/2004 | Brandenberger ............. 715/511 |
| 2004/0073708 A1* | 4/2004 | Warnock ............. G06F 17/2247 709/246 |
| 2006/0143562 A1* | 6/2006 | Seurig ................. G06F 17/2247 715/234 |
| 2006/0174199 A1* | 8/2006 | Soltis ..................... G06F 17/211 715/700 |
| 2008/0028300 A1* | 1/2008 | Krieger .................. G06Q 10/10 715/255 |
| 2009/0006454 A1* | 1/2009 | Zarzar ................. G06F 17/2247 |
| 2010/0070775 A1* | 3/2010 | Dik et al. ...................... 713/187 |
| 2011/0138268 A1* | 6/2011 | Zhang et al. ................ 715/239 |
| 2011/0252312 A1* | 10/2011 | Lemonik et al. ............. 715/255 |
| 2012/0192064 A1* | 7/2012 | Antebi et al. ................ 715/255 |
| 2013/0283147 A1* | 10/2013 | Wong et al. .................. 715/234 |

* cited by examiner

*Primary Examiner* — Zarni Maung
(74) *Attorney, Agent, or Firm* — Buckley, Maschoff & Talwalkar LLC

(57) ABSTRACT

Methods are provided for collaborative editing of documents which allow users who are editing source code to see previews of a compiled document as the process of editing continues. During editing, the source code is compiled to provide a compiled document from which previews can be produced. Steps can be taken to ensure that previews are only produced and/or sent to the user for those pages that have been changed since a previous compile. Moreover, a pre-compile checking process may avoid unnecessary attempts to compile incomplete or erroneous source code.

15 Claims, 2 Drawing Sheets

COLLABORATIVE EDITING

FIELD OF THE INVENTION

The present invention relates to the creation and editing of documents, particularly online. More particularly, but not exclusively, the present invention relates to the editing of documents in the LaTeX programming language.

BACKGROUND OF THE INVENTION

LaTeX is a programming language for the preparation and editing of documents. It offers consistent and high quality typesetting and its use is widespread in academia, particularly in the fields of mathematics, physics, computer science and other technical disciplines.

The process of document creation in LaTeX differs from conventional word processors in that the user does not edit a representation of the final document, but rather edits a source code file together optionally with additional data files (such as additional text files and/or additional image files). The source file and additional data files can be understood as input files which are compiled to produce the final document. In typical implementations, the final document is output in a portable document format ("pdf") such as Adobe™ pdf.

The compiling is accomplished by a LaTeX interpreter which executes the commands in the source file and brings in data from additional data files as required in order to produce the final document. The source file may also reference standard packages, which are libraries of source code that can be applied across multiple documents. The LaTeX interpreter, packages and many supporting fonts and programs are usually bundled together and provided in a LaTeX distribution.

This approach to document creation and editing introduces a separation between the edits applied by the user to the source file and their effect on the final document. This separation is reconciled by the step of compiling the document. The separation is relatively easily managed in circumstances in which the document is created and edited locally at a user's computer. In such circumstances, the storage, editing and compiling processes occur in the same place and can thus be closely monitored. However, the system becomes more complex when collaborative creation and editing of documents is desired.

In a basic approach, collaborative editing may be carried out by simply passing source files from author to author, with each author making edits to the source file in turn. The source files can be shared over email, for example. However, this process is not ideal, because if multiple authors wish to work on the document simultaneously, a number of different source files may be generated that each contains an individual author's edits. It can prove difficult and cumbersome to reconcile these into a consolidated source file containing the edits put forward by all authors.

There are solutions known as "version control systems" which are intended to assist in the management of multiple versions of source files that can originate in this way. However, these are relatively difficult to effectively set up, maintain and use. As a result, alternative approaches have been developed. In particular, it has been proposed that rather than provide multiple local versions of source files that are separately edited, authors should access a central version of the source file and edit this directly. In this way, edits from all authors are consolidated from the outset in the central copy of the source files. There are, however, technical difficulties in implementing this approach in a user-friendly way.

These difficulties relate in part to the compiling step necessary for LaTeX documents. Specifically, while the user edits the source file (rather than the final document), it is desirable to provide a real-time, or near real-time, preview of how the final document will appear during the editing process. This allows authors to identify mistakes or formatting imperfections early and ensure that the document progresses as hoped. A genuine "preview" of this kind can only be provided by compiling the document as usual. This requires multiple compiles during the editing process. When documents are managed and edited locally, such multiple compiles are not overly burdensome using conventional personal computers, but when the document is managed and edited remotely each compile occurs on a central server and generates a new document which must subsequently be downloaded to the author. There are resulting pressures on the processing load of the server and on the network bandwidth of the connection between the author and the server.

As a result of the above, existing solutions that rely on central management of the source code are limited by the server's processing capabilities and the bandwidth of the network connection. These limitations become increasingly severe as more users access the service. It would therefore be desirable to limit this hardware restriction.

SUMMARY OF THE INVENTION

According to a first aspect of the present invention, there is provided a method of previewing a compiled document, comprising
- transmitting document content from a client device to a compile server at determined intervals;
- compiling a document from the document content at the compile server;
- generating and storing hash values associated with each page of the compiled document;
- comparing the generated hash values with previously stored hash values;
- producing page previews for individual pages of the compiled document;
- providing the page previews to the client device for those pages associated with a generated hash value that does not match a previously stored hash value.

The present invention presents an efficient method for the generation of previews of a compiled document, such as a document written in the LaTeX language. At determined intervals, document content is provided to a compile server for compilation. The intervals may be determined on the basis of thresholds in terms of elapsed time from a previous compile and/or may be determined on the basis of analysis of the document content for its suitability for compilation, or on the basis of other predetermined or calculated criteria. After the compile process, a hash process is used to avoid the unnecessary resending of pages that have previously been compiled to the user. In particular, page previews are provided to the client device only for those pages associated with a generated hash value that does not match a previously stored hash value.

In some embodiments, the hash values are stored as the file names for page previews that have been produced. Thus, the step storing the hash values for later comparison need not occur simultaneously with the generation of the hash values, but may occur after page previews are produced. Nevertheless, in alternative embodiments, the values may additionally or alternatively be stored in separate locations and/or databases.

Preferably, page previews are produced only for those pages associated with a generated hash value that does not match a previously stored hash value. Thus, page previews may not be generated when the hash value for a page matches a previously stored value. This avoids the processing load needed for the production of duplicate page previews.

In some preferred embodiments, producing page previews comprises rastering pages in the compiled document to generate page previews in a raster image format. When rastered, the page previews are image files which can be readily rendered at a client device. By image files, raster image files which define an image by pixel values are intended, unlike the originally compiled document, which is often in a vector format, and particularly commonly is in an Adobe portable document format (pdf). Where page previews are only generated when the hash value for that page does not match a previously stored page, a significant advantage is incurred by avoiding unnecessary rastering of page previews.

In alternative embodiments, no format change is implied by the producing of the page previews from the compiled document. That is, the step of producing page previews comprises extracting pages from the compiled document in the same file format as the compiled document. For example, the page previews may be single page pdf files generated from a complied document that is a multi-page pdf file. Nevertheless, page previews are preferably produced only if the generated has value associated with that page does not match a previously stored hash value.

In some further embodiments, the page previews may be produced in an different format to the compiled document which is a not-raster image file. For example, page previews may be produced in a vector format, such as the Scalable vector Graphics (svg) format.

It should be understood that page previews are not necessarily exact copies of the pages within the compiled document. In particular, reduction of the file size of the page preview may be achieved by downsampling or compression of images or other elements within the page during production of the page preview. Similarly, page previews may not correspond precisely to an entire page of the compiled document, but may represent a section of that page, for example. Reducing the size of the page previews reduces bandwidth usage in returning the previews to the client device. Steps to reduce file size may be taken in dependence on an analysis of the predicted file size of the page preview.

Preferably, the determined intervals are calculated such that they are at least equal to a first predetermined period of time calculated from a time at which a most recent compile took place. In this manner, a minimum gap between compiles in enforced to avoid excessive updating of the compiled document and/or page previews. This further reduces processing load on the system.

Moreover, the determined intervals are calculated to expire after a second predetermined period of time from when the most recent user action took place. By ensuring that the compile does not take place when the user is in the middle of extended activity, the amount of compiling errors can be reduced and, furthermore page previews are produced at moments when the user is likely to be able to view them.

In some preferred embodiments, the determined intervals are calculated in dependence upon a pre-compiling process which assesses the suitability of the document content for compiling. For example, the pre-compiling process may comprise a syntax check or other analysis which is able to identify reasons that a compile will fail without going through the compile process itself. This reduces unnecessary processing in failed compile processes, reducing load on the system further.

Indeed, the implementation of a pre-compile process of this kind in this context is considered new in of itself and according to a second aspect of the present invention, there is provided a computer implemented method of previewing a compiled document, comprising:

transmitting document content from a client device to a compile server at determined intervals;

compiling a document from the document content at the compile server;

producing a document preview of the compiled document; and providing the document preview to the client device, wherein the determined intervals are calculated in dependence upon a pre-compiling process which assesses the suitability of the document content for compiling.

According to the second aspect, processing load is reduced in a method for previewing a compiled document by ensuring that compiles only take place when the document content is assessed as suitable for compiling. The document preview may comprise page previews for individual pages of the compiled document as in the first aspect.

Preferred features of the first aspect may also be applied to the second aspect as appropriate. It can also be appreciated that the invention can be implemented using computer program code. Indeed, according to further aspects of the present invention, there is therefore provided a computer program product comprising computer executable instructions for carrying out the method of the first or second aspects. The computer program product may be a physical storage medium such as a Read Only Memory (ROM) chip. Alternatively, it may be a disk such as a Digital Versatile Disk (DVD-ROM) or Compact Disk (CD-ROM). It could also be a signal such as an electronic signal over wires, an optical signal or a radio signal such as to a satellite or the like. The invention also extends to a processor running the software or code, e.g. a computer or a computer system configured to carry out the method described above.

BRIEF DESCRIPTION OF THE DRAWINGS

A preferred embodiment of the present invention will now be described with reference to the accompanying drawings, in which.

DETAILED DESCRIPTION

Figure 1:
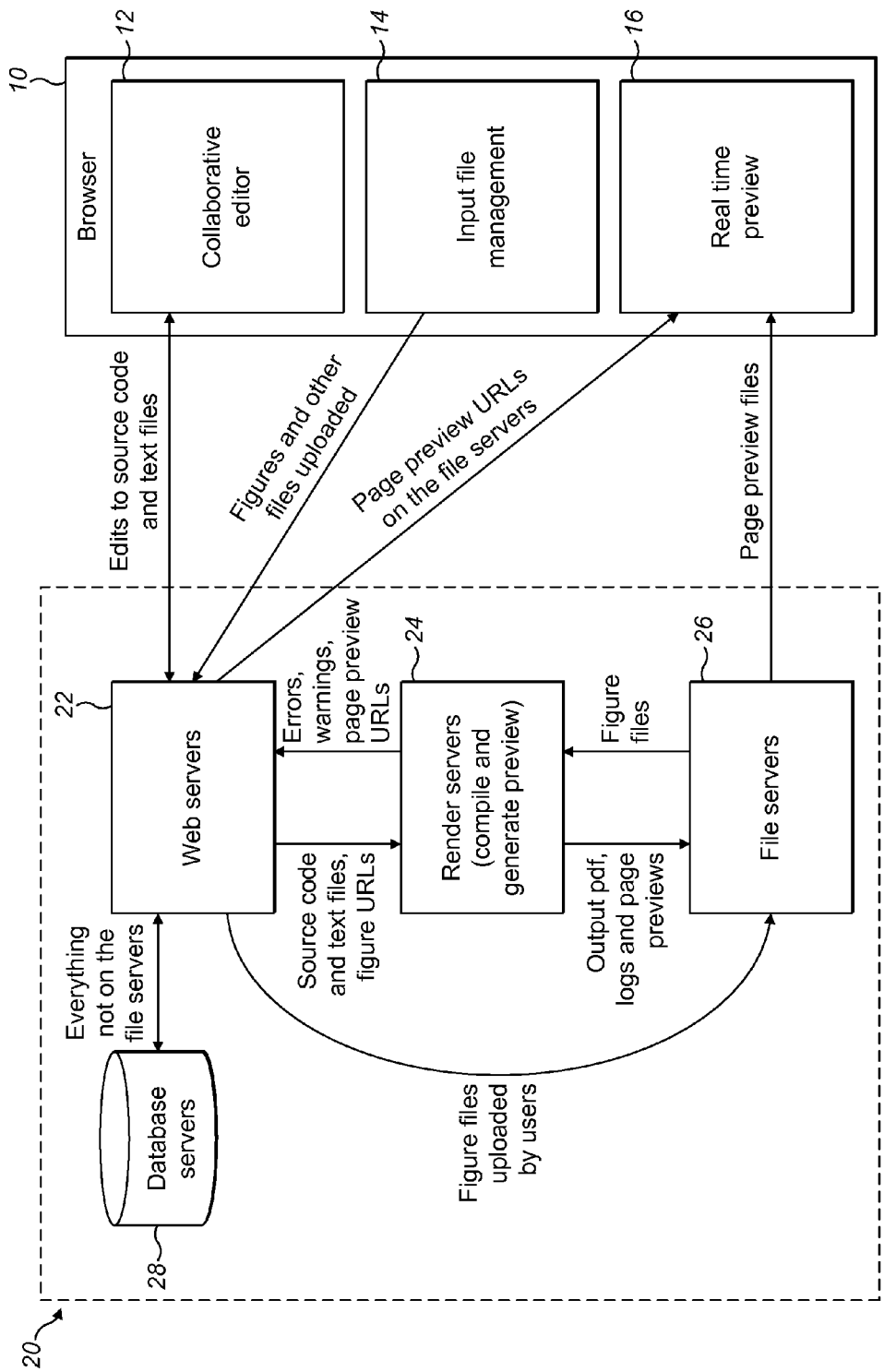
FIG. 1 shows a system for providing previews of a compiled document.

Referring to FIG. 1, there is provided a system for collaborative editing of documents. In particular, the system is arranged for the editing of LaTeX documents, although in other embodiments alternative markup languages (such as Markdown, Textile and ReStructuredText) may also be provided.

The system comprises a client device 10 and a plurality of servers 20 connected via a network. The network is preferably the internet, although other networks may be used.

Indeed communications between different aspects of the system may be effected through different networks if appropriate.

The client device is operated by a user and is typically a personal computer. Alternative networked computer devices, such as mobile phones or tablet computers, may also be used as the client device by the user. In FIG. 1, only a single client device 10 operated by a single user is shown, but it will be understood that multiple client devices operated by multiple users will typically be provided. This allows multiple users to access the system to edit the same document at the same time.

The client device uses a conventional operating system and runs a browser through which communications with the servers 20 may be established. A browser application comprising multiple components is provided for the editing of documents. The components comprise a collaborative editor 12, an input file management component 14 and a real time preview component 16. The collaborative editor allows the user to enter edits to the source code of a document, the input file management component allows the user to provide additional data files for the document and the real time preview component can be used to display previews of the compiled document to the user.

The servers comprise web servers 22, render servers 24, file servers 26 and database servers 28. Each server may be implemented by a conventional computer server or may be distributed amongst computer servers. In this context, a computer server is any computing device capable of acting to serve data to the client device 10. It is to be understood that the distinctions between the servers 20 shown in FIG. 1 are logical distinctions, and may not directly correspond to the physical resources used to implement the servers 20. For example, a single server may be distributed amongst multiple devices and conversely multiple servers 20 may be implemented on a single computing device, as appropriate.

The web servers 22 provide the browser application to the client device 20, and manage the source code of the document. The web servers 22 are arranged to receive edits to the source code from the collaborative editor 12. The web servers 22 may also receive additional image and other files for incorporation into the document from the input file management component 24. The web servers are also adapted to provide network addresses (such as Uniform Resource Locators (URLs)) for page previews of the compiled document to the real time preview component 26. This allows the real time preview component 26 to access page previews when they are created.

The render servers 24 are communicatively coupled to the web servers 22 and the file servers 26. The render servers act to receive source code from the web servers 22 and compile the document from that source code before generating previews of each page of the document. Failures to compile the document are reported to the web servers 22 as errors in the source code which may be reported to the client device 20. The render servers 24 also return address information for generated page previews which can be passed on to the real time preview component 26, allowing the client device 20 to access the page previews.

The render servers 24 may include image files and other additional data in the compilation of the document. These are received from the input file management component 24 by the web servers 22, but may be stored elsewhere, such as in the file servers 26. In this case, the web servers 22 do not provide the image and other data files to the render servers 24 directly but instead provide links to the location within the file servers 26 at which this data is stored. The render servers 24 can then retrieve this data from the file servers 26 as necessary for compilation of the document.

The web servers 22 are arranged to provide the compiled document and page previews to the file servers 26. The file servers 26 are arranged to provide the page previews to the real time preview component 16 as and when they are requested.

The database servers 28 are used to store data for later use by the web servers 22. For example, the database servers 28 store source code which is not currently being edited and other data useful for the management of the system. For example, the database servers 28 may store user account details, the relationships between users and documents, error messages from the compile servers and the URLs of page previews.

In operation, the user of the client device 10 loads the browser on the client device and accesses a web page from the web servers 22. The web servers return the application for collaborative editing. The user may access the source code of a document that they wish to edit from the web servers 22 through the collaborative editor 12. In practice, there may be a log in screen, where the user is invited to provide username and password details. This provides security for the documents, and also easily enables the servers 20 to identify documents associated with user.

In preferred embodiments, both the source code and a preview of the compiled document are provided to the user for simultaneous display on the client device. To achieve this, the web servers 22 provide the URLs of the page previews of the document to the client device 10. The user then proceeds to make changes to the document using the collaborative editor.

As the user edits the document, the page previews that have been provided become obsolete. It is therefore desirable to update the page previews as editing occurs in order to provide a current preview to the user. In one example, updated previews could be generated after every keystroke provided by the user. However, this would require the document to be compiled at each keystroke, which would use a large amount of server resource. Furthermore, many of these compiles would fail due to incomplete syntax in the source code, and an even greater proportion would be of no benefit to the user as they would represent incomplete semantic clauses.

The preferred embodiment therefore selectively chooses when a re-compile of the source code should be carried out. Preferably, the system is arranged such that a new compile will only occur when a first predetermined period of time (such as four seconds) from the previous complete compile has taken place.

An additional check that is preferably added to that described above is that compile will only occur after a lack of activity from the user for a second predetermined period of time (such as half a second). User activity can be measured by keystrokes, for example, or may additionally or alternatively include other inputs such as cursor movement. In this way, compiles are not executed while the user is in the process of inputting edits to the source code.

A further additional check to one or both of the above, is a pre-compile process during which the syntactic quality of the source code is checked to reject source code which will not compile. This pre-compile process may analyse the syntax of the source code but does not actually compile it. The pre-compile process may be considered a "sanity check" which avoids attempts to compile source code which is clearly incomplete. The pre-compile process may be designed such that valid source code is always allowed to proceed to compile, whereas the pre-compile process may fail to identify all invalid source code.

The pre-compile process may be carried out by the web servers 22 or may additionally or alternatively comprise elements implemented by the client device 10. For example, certain tools exist which are able to analyse aspects of the source code within the browser. One such example is the MathJAX tool which is known in the art. Results from such components are not necessarily directly applicable to the compile process but may be used to inform the pre-compile process to decide whether a compile is appropriate.

Figure 2:
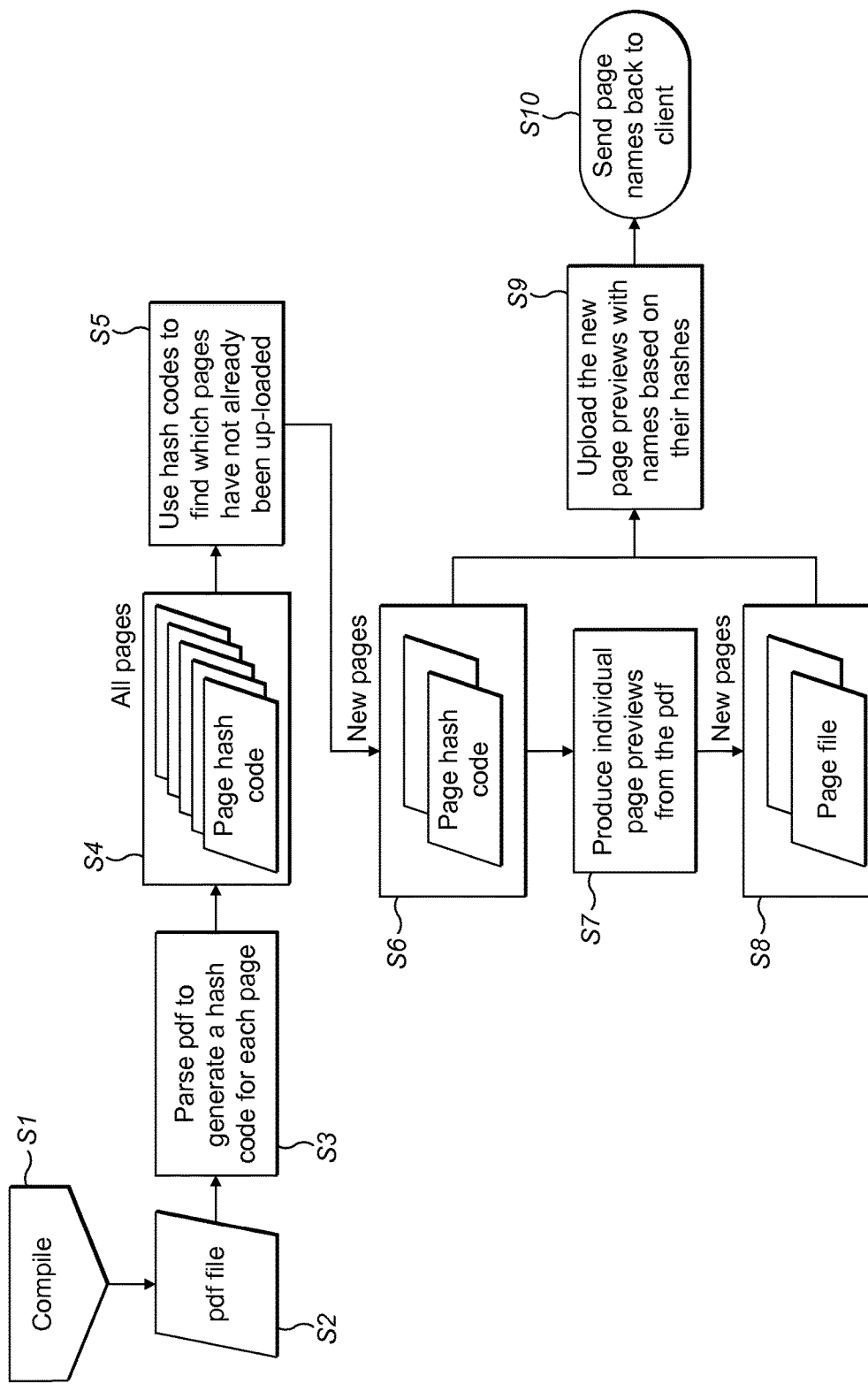
FIG. 2 illustrates a flow diagram of a method of using hash values to avoid unnecessary repetition of previously provided page previews.

When a compile is undertaken, a process for generating previews of each page of the compiled document is undertaken. This can be understood with reference to FIG. 2.

The edits to the document are provided to the web servers 22 from the client device 10. The web servers 22 consolidate the edits with the original source code to provided edited source code to the render servers 24. This source code is used to compile the document at step s1. The result is a pdf document, at step s2. In particular, in preferred embodiments, the compiled document is an Adobe pdf document. However, in other embodiments, the compiled document may be in an alternative format, such as a Device Independent (DVI) file format. The subsequent method steps can equally be applied regardless of the format of the compiled document.

At step s3, the pdf document is parsed to generate one or more hash values for each page of the pdf document. Additional hash values may also be created for the universal document attributes, for example, while the hash values for the pages may comprise values based on the raw pdf content for the pages and hash values based on other aspects, such as "XObjects" within the page. It is valuable to provide a hash value for selected universal attributes as well as for each page, since this may reflect a change in universal attributes that can alter a page's appearance even if the raw data for that page remains unchanged. For example, a universal attribute can enable or disable hyperlinks within the text. If such a universal attribute has changed then it can be assumed that all pages have changed and the subsequent check for each page may not be required.

The hash values are stored at step s4, and the hash values for each page are then compared with previously stored hash values at step s5, to identify which pages have changed since the last compile. The hash values of the pages that have changed are identified at step s6, and individual page previews for those pages are produced from the document pdf at step s7. These page previews are uploaded to the file servers 26 at step s8, from where they can later be accessed by the client device 10.

The step of producing the page previews may comprise rastering those selected pages of the compiled document to generate raster image files. The process of rastering the pages to produce image files (such as .jpeg files) enables the browser at the client device to readily render the page previews since they are in a format that is easily handled by the browser. In other embodiments, the browser may be enabled to render pdf files directly and the production of the page previews may comprise extracting the relevant pages from the compiled document without rastering to change the file format. During extraction of this type, additional processing may occur if desired, to reduce the size of incorporated images, for example. However, this ability to directly reproduce pdf files is not available on many browsers and may create security concerns due to the potential delivery of javascript via pdf files. In some circumstances, it may nevertheless be desirable to deliver the changed pages to the user as pdf files since these are typically more compressed than image files for substantially text based documents.

The page previews are stored on the file servers 26 using the hash value as the file name, to allow easy comparison during subsequent iterations of step s5. Address information (such as a URL) for each page preview is returned to the real time preview component 16 via the web servers 22. The real time preview component can then request the updated page previews from the render servers 22 using the address information, and these pages are delivered to the client device 10 at step s10.

The process described above ensures page previews are only created and/or delivered to the client device 10 for those pages that have changed. This ensures no unnecessary bandwidth use is required to send unchanged pages back to the client device 10 for preview and also ensures that no unnecessary processing load is incurred in producing page previews for those pages.

There are a number of preferred features of the implementation of the method which offer advantages. For example, in order to ensure that any security risk presented by the requirement to compile and execute source code from unknown users is mitigated, the compile process at the render servers is carried out in a sandboxed environment such that the compiling process is unable to write to files outside its own working directory. Furthermore, the rendering process occurs in a "change root jail" (chroot jail) using an account on the servers with minimal privileges. Accordingly, the compile happens on a dedicated file system, logically separated from the server's main file system by the operating system (Linux in the preferred embodiment). To escape this limitation would require a fault in the operating system itself.

In addition to the above, security is provided by the architecture of the system. The render servers 24 do nothing else part from compile documents and do not have privileged access to the web servers 22. Thus, compromise of a render server does not imply compromise of the web application itself.

Improved performance is achieved by the introduction of various caching processes on the render servers 24. For example, an "input cache" may be provided to store input files (i.e. additional data files originating from the input file management component 14) so that they do not have to be retrieved from the web servers 22 on each occasion that compiling is required. Furthermore, a page cache can be provided on each render server 24 which maintains a record of the hashes of previously stored page previews. In this way, it is not always necessary to contact the file servers to establish whether a page has previously been stored. An output cache may also be provided which contains previously compiled documents. It is possible that even when edits have occurred to the source code the compiled document is unchanged (for example, if the edits consist of comments within the source code). An output cache may contain has values for previously compiled documents, such that when there has been no change it is not necessary to upload the compiled document again or to analyse for changes in individual pages.

To make the best use of the caching processes described above, it is preferred that a given document is always compiled by the same render server 24. Accordingly, documents may be assigned a preferred render server 24 which will be used for compilation of that document assuming that render server 24 is available. If the render server 24 assigned as preferred for a given document is busy, an assessment can be made as to whether to wait for it to become available or to compile the document at another render server. This assessment may be carried out on the basis of factors such as the queue length at the preferred render server and the perceived advantage of the caching processes, for example.

There may also be an ongoing process to remove obsolete pages from the servers 20. For example, when it is found that a certain hash no longer appears for the pages of the compiled document, the stored image file for that page may be removed.

Other variations and modifications will be apparent to the skilled person. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination.

It should be noted that the term "comprising" does not exclude other elements or steps, the term "a" or "an" does not exclude a plurality, a single feature may fulfil the functions of several features recited in the claims and reference signs in the claims shall not be construed as limiting the scope of the claims. It should also be noted that the Figures are not necessarily to scale; emphasis instead generally being placed upon illustrating the principles of the present invention.

The invention claimed is:

1. A computer implemented method of previewing a compiled output document, comprising:
   amending a source code file at a client device;
   receiving, at a compile server, document content in the form of amendments to the source code file, wherein said document content is transmitted from the client device to the compile server at determined intervals;
   automatically compiling the compiled output document at the compile server upon receipt of said amendments by transforming the source code file into a compiled file format which is different from the format of the source code file;
   generating and storing, by the compile server, hash values associated with each page of the compiled output document;
   comparing, by the compile server, the generated hash values with previously stored hash values;
   producing, by the compile server, page previews for individual pages of the compiled output document; and
   providing the page previews from the compile server to the client device for those pages associated with a generated hash value that do not match a previously stored hash value.

2. A method according to claim 1, wherein page previews are produced for those pages associated with a generated hash value that does not match a previously stored hash value.

3. A method according to claim 1, wherein the step of producing page previews comprises rastering pages in the compiled document to generate page previews in a raster image format.

4. A method according to claim 1, wherein the step of producing page previews comprises extracting pages from the compiled output document in the same file format as the compiled output document.

5. A method according to claim 1, wherein the compiled output document is in a portable document format.

6. A method according to claim 1, wherein the determined intervals are calculated such that they are at least equal to a first predetermined period of time calculated from a time at which a most recent compile took place.

7. A method according to claim 1, wherein the determined interval are calculated to expire after a second predetermined period of time from a most recent user action took place.

8. A method according to claim 1, wherein the determined intervals are calculated in dependence upon a pre-compiling process automatically carried out by the client device which assesses the suitability of the document content for compiling based on the syntax of source code contained in the source code file.

9. A non-transitory computer readable medium comprising computer executable instructions for carrying out the method of claim 1.

10. A computer implemented method of previewing a compiled output document, comprising:
    amending a source code file at a client device;
    receiving, at a compile server, document content in the form of amendments to the source code file stored on the compile server, wherein said document content is transmitted from the client device to the compile server at determined intervals;
    automatically compiling the compiled output document at the compile server upon receipt of said amendments by transforming the source code file into a compiled file format which is different from the format of the source code file;
    generating and storing, by the compile server, hash values associated with each page of the compiled output document;
    producing, by the compile server, a document preview of the compiled output document; and
    providing the document preview from the compile server to the client device,
    wherein the determined intervals are calculated in dependence upon an automatic pre-compiling process carried out by the client device which assesses the suitability of the document content for compiling based on the syntax of source code contained in the source code file.

11. A non-transitory computer readable medium comprising computer executable instructions for carrying out the method of claim 10.

12. A method of claim 1, wherein said source code file comprises source code written in TeX or a language derived from TeX, and wherein said compilation step is performed using a TeX interpreter or an interpreter appropriate for the derived language.

13. A method of claim 10, wherein said source file comprises said source code file written in TeX or a language derived from TeX, and where said compilation step is performed using a TeX interpreter or an interpreter appropriate for the derived language.

14. A method of claim 12, wherein said compile process is carried out in a sandboxed environment.

15. A method of claim 13, wherein said compile process is carried out in a sandboxed environment.

* * * * *